United States Patent
Paillet

(10) Patent No.: US 11,310,310 B2
(45) Date of Patent: Apr. 19, 2022

(54) COMMUNICATION DEVICE FOR PEER-TO-PEER COMMUNICATION AND A COMMUNICATION NETWORK USING THE SAME

(71) Applicant: Orange, Paris (FR)

(72) Inventor: Eric Paillet, Tregastel (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/942,305

(22) Filed: Mar. 30, 2018

(65) Prior Publication Data

US 2018/0288140 A1 Oct. 4, 2018

(30) Foreign Application Priority Data

Mar. 31, 2017 (FR) ...................................... 1700353

(51) Int. Cl.
*H04W 4/70* (2018.01)
*H04L 67/104* (2022.01)
*H04L 67/1061* (2022.01)
*H04W 28/02* (2009.01)
*H04W 28/08* (2009.01)
*H04W 76/14* (2018.01)
(Continued)

(52) U.S. Cl.
CPC ........ *H04L 67/104* (2013.01); *H04L 67/1068* (2013.01); *H04W 4/70* (2018.02); *H04W 8/005* (2013.01); *H04W 28/0215* (2013.01); *H04W 28/0875* (2020.05); *H04W 76/14* (2018.02); *H04W 84/18* (2013.01)

(58) Field of Classification Search
CPC .......... H04L 29/08306; H04L 67/104; H04W 4/005; H04W 4/70; H04W 28/0215; H04W 28/0875; Y02D 70/21
See application file for complete search history.

(56) References Cited

U.S. PATENT DOCUMENTS

2004/0044727 A1* 3/2004 Abdelaziz ............. H04L 67/107
709/203
2007/0183342 A1 8/2007 Wong et al.
(Continued)

OTHER PUBLICATIONS

"3GPP TS 23.303 v14.1.0" Dec. 2016, pp. 1-124 (Year: 2016).*
French Search Report dated Jan. 16, 2018 for French Application No. 1700353.

*Primary Examiner* — Salvador E Rivas
(74) *Attorney, Agent, or Firm* — Knobbe, Martens, Olson & Bear, LLP

(57) ABSTRACT

A communication device can have a peer-to-peer communication application installed on it. The device can be configured to detect at least one other communication device including the peer-to-peer communication application, and may be configured to set up a connection with the detected communication device. The device can be configured to, in response to a request to set up peer-to-peer communication sent to the first device on a predetermined port and via a predetermined protocol by a second detected device exchange with the second device information required for setting up peer-to-peer communication with the second device, and to set up the peer-to-peer communication. The peer-to-peer communication application can be configured to send, on the predetermined port and via the predetermined protocol a request to set up peer-to-peer communication to a third detected communication device.

20 Claims, 2 Drawing Sheets

(51) Int. Cl.
*H04W 8/00* (2009.01)
*H04W 84/18* (2009.01)

(56) References Cited

U.S. PATENT DOCUMENTS

| | | | | |
|---|---|---|---|---|
| 2012/0054571 | A1* | 3/2012 | Howard | H04W 4/50 |
| | | | | 714/748 |
| 2014/0341112 | A1* | 11/2014 | Agiwal | H04L 61/2007 |
| | | | | 370/328 |
| 2015/0180825 | A1* | 6/2015 | Ren | H04L 65/1033 |
| | | | | 709/228 |
| 2017/0346741 | A1* | 11/2017 | Chatterjee | H04L 61/2589 |

* cited by examiner

COMMUNICATION DEVICE FOR PEER-TO-PEER COMMUNICATION AND A COMMUNICATION NETWORK USING THE SAME

CROSS-REFERENCE TO RELATED APPLICATIONS

This application claims priority to French Patent Application FR 1700353, filed Mar. 31, 2017, the disclosure of which is incorporated herein by reference in its entirety.

BACKGROUND

Technical Field

Embodiments discussed herein relate to the general field of communication between a plurality of devices, such as for example: computers, mobile telephones, digital tablets, etc.

Embodiments relate more particularly to peer-to-peer (P2P) communication between a plurality of devices. The term "peer-to-peer communication" between two devices or two terminals means exchanging data between those two devices without passing via a central server. The exchange may be direct between the two devices (the communication is then said to be "device-to-device" or "D2D"), or it may take place via one or more intermediate devices implementing D2D communication in pairs. The set of devices in this kind of peer-to-peer connection forms a mesh network without any central hierarchy. By installing an appropriate peer-to-peer communication application, each device (or peer) in such a mesh network is capable of receiving, sending, and relaying data to another device (i.e. another peer) of the network that is fitted with the same application. No limitation is associated with the type of data that is exchanged (voice, text, data, etc.) between the two devices during peer-to-peer communication.

Devices in a mesh network can use various connectivity technologies to connect with one another in order to perform peer-to-peer communication via a dedicated communication application. In particular, they may rely equally well on Bluetooth, WiFi (wireless fidelity), WiFi Direct, long term evolution (LTE) Direct, etc. technologies. They may also be connected to elements that are outside the mesh network, such as for example to other devices belonging to operator networks (e.g. 3G, 4G, 5G, etc. networks) or to private networks, etc., e.g. in order to access the public Internet network.

There is presently great interest in mesh networks. By way of example, they have demonstrated that they are effective in providing communication services that are resilient in the face of voluntary or involuntary interruptions occurring in conventional communication networks, e.g. in time of war or as a result of a natural catastrophe. Such mesh networks can also be envisaged for the purpose of providing protection against cyber surveillance or for preventing the data exchanged between the devices from passing over the public Internet. Many other applications can be envisaged for mesh networks.

Several solutions already exist for enabling devices to perform peer-to-peer communication within a given mesh network. These solutions include some, such as Serval Mesh or FireChat, that also provide the possibility of performing peer-to-peer communication in real time. Nevertheless, none of the known solutions enables two devices belonging to two distinct mesh networks to perform peer-to-peer communication, and in particular to provide real time voice communication in simple manner.

Specifically, with Serval Mesh, real time communication within a given mesh network relies either on exchanging text type messages, or else, for voice communication, on defining new protocols known as voice over mesh protocol (VoMP) and mesh datagram protocol (MDP), competing with Internet protocol (IP). Having recourse to those two protocols, which are not standardized, makes it difficult to envisage peer-to-peer voice communication in real time between two devices belonging to two distinct mesh networks.

FireChat proposes various solutions that enable two devices seeking to perform peer-to-peer text data exchange and that are not directly connected to each other within the same mesh network, to communicate with each other in real time. One of those solutions consists in passing via a predetermined device that acts as a relay. Another solution consists in broadcasting data that is to be exchanged to all of the devices of the mesh network: it is then the FireChat application that is installed on each of the devices of the mesh network that is in charge of sorting through the text data as broadcast in that way in order to extract the data relating to the device on which the application is installed. Both of those solutions are limited to exchanging text data within a same given network.

A third solution envisaged by FireChat enables two devices belonging to two distinct mesh networks to exchange text data via a dedicated centralized storage server that is accessible on the Internet. That server, which acts as a relay between the devices of the two mesh networks (and which is suitable for storing the data if one of the devices does not answer), does not communicate in peer-to-peer mode with the two devices of the two mesh networks. In addition, its mode of operation is not necessarily synchronous (in particular if one of the devices is not available), which can make it difficult (or indeed impossible) to provide real-time communication between the two devices. Furthermore, and as mentioned above, FireChat is limited to exchanging text data.

There therefore exists a need for an end-to-end peer-to-peer communication solution that serves in particular to enable two devices belonging to two distinct mesh networks to set up communication between each other conveniently, and in particular real-time voice or video communication.

SUMMARY

In one embodiment, a communication device is disclosed, referred to as a "first" device, comprising:
  a peer-to-peer communication application;
  a detector module configured to detect at least one communication device including said peer-to-peer communication application, the detector module being suitable for setting up a connection with the detected communication device; and
  a linking module, accessible in server mode on a predetermined port and via a predetermined protocol, the linking module being configured, in response to a request to set up peer-to-peer communication sent to the first device on said predetermined port and via said predetermined protocol by a second device detected by the detector module, to exchange with said second device information required for setting up peer-to-peer communication with said second device, and to set up said peer-to-peer communication;

wherein the peer-to-peer communication application is also suitable for sending on said predetermined port and via said predetermined protocol a request to set up peer-to-peer communication to a third communication device detected by the detector module.

Preferably, the communication application is configured to send the setup request to a linking module of the third communication device.

The term "accessible in server mode" is used to mean that the linking module is configured to listen to a predetermined port with a predetermined protocol in order to detect whether a particular predefined request (i.e. a request to set up peer-to-peer communication) is being sent specifically thereto, and to respond to said request by triggering an exchange of information with the device that sent it the request in order to be capable of setting up a peer-to-peer communication link with that device. This linking between the first and second devices as made by the linking module of the first device serves advantageously to enable the first device to obtain the prior information that is required for setting up a peer-to-peer communication link with the second device, and subsequently to enable peer-to-peer communication between the two devices.

Using embodiments discussed herein, two peers can enter directly into contact, and in particular can set up interactive communication between each other, without needing a dedicated server, whether internal or external.

Correspondingly, embodiments provide a communication network comprising a plurality of communication devices in accordance with the embodiments discussed herein.

Thus, embodiments provide the possibility of having end-to-end peer-to-peer communication between two devices, even when those devices are in distinct mesh networks, and to do so regardless of the type of interconnection, if any, existing between the distinct mesh networks (connections passing via (3G, 4G, etc.) mobile networks, via business networks, via private networks, or via the Internet, etc.), and regardless of the mode of connectivity used within each mesh network (the mesh networks may make use of distinct modes of connectivity).

Since the peer-to-peer communication made possible by the embodiments discussed herein relies on a network made up of elements or devices (including the two devices seeking to communicate with each other), each having at least three modules identical with the others, namely the same peer-to-peer communication application, a detector module enabling them to detect elements of the network, and a linking module enabling the network elements to set up peer-to-peer communication step by step. By means of this architecture, it is possible to provide peer-to-peer communication between any devices, even if they do not belong to the same mesh network, including real-time peer-to-peer communication such as voice communication. Nevertheless, it should be observed that aspects of the embodiments discussed herein can apply to any type of communication (i.e. transporting text, voice, video, etc.) whether in real time or asynchronously. By aggregating a plurality of embodiments of communication devices that are capable of peer-to-peer communication, the embodiments discussed herein thus make it possible to form a kind of "global" mesh network, regardless of the configuration and the nature of the sub-networks to which the communication devices under consideration belong.

Advantageously, all of this is made possible by the embodiments discussed herein without any need to define new protocols. In particular, the embodiments discussed herein are compatible with the existing Internet protocol (IP) as is conventionally used in most present-day networks.

The devices of the network of the embodiments discussed herein may belong to sub-networks that are different, but that is not necessary.

Thus, in a particular embodiment, at least two communication devices of said plurality of communication devices of the network of the embodiments discussed herein belong to distinct peer-to-peer mesh (sub-)networks.

The embodiments discussed herein thus make it possible to aggregate together a plurality of mesh sub-networks, while maintaining peer-to-peer communication between the devices of those sub-networks.

Nevertheless, it should be observed that the embodiments discussed herein do not exclude the possibility of certain devices in the network of such embodiments also belonging to a network other than the mesh network, such as for example to a private network, a business network, an operator network, or indeed the public Internet. The communication device of the embodiments discussed herein may for example be integrated in a server or in any other piece of equipment of an operator network. By having the three above-mentioned components available within such a piece of equipment (i.e. a peer-to-peer communication application, a detector module, and a linking module) it is possible to have peer-to-peer communication relying on that equipment even if the equipment belongs to a network of architecture different from the architecture of a mesh network and using communication with some other connectivity solution (Wi-Fi, 4G, . . . ) and some other mode of operation. The embodiments discussed herein thus enable devices belonging to a variety of different networks to engage in peer-to-peer communication.

In a particular implementation, the linking module of the communication device of the embodiments discussed herein is in compliance with web real-time communication (WebRTC) technology.

This embodiment has a preferred application for real-time communication. In known manner, WebRTC is a JavaScript programming interface (or application programming interface (API)) currently being defined by the Internet engineering task force (IETF) and the World Wide Web Consortium (W3C), in order to be integrated within web browsers so as to enable real-time communication. This embodiment thus serves to facilitate implementing and developing the embodiments discussed herein by relying on a standardized interface.

In another embodiment, the linking module is suitable for exchanging, with said second communication device, information relating to the capabilities of the first and/or the second device and/or information required for setting up peer-to-peer communication between the first and second devices.

This information serves to facilitate setting up peer-to-peer communication between the first and second devices. By way of example, such information may comprise connectivity information such as an interactive connectivity establishment (ICE) candidate, as is conventionally used (in particular by WebRTC) for connecting two peers together within a network, for initiation parameters of session description protocol (SDP)session, information about the external connections of the devices towards other connectivity interfaces, available bandwidths, etc. Such information may also include information about the capabilities of the devices, such as for example storage capacity, memory capacity, available central processor unit (CPU) capacity, etc.

This information may also advantageously be used when peer-to-peer communication is envisaged between two remote devices via one or more intermediaries. It makes it possible to select such intermediaries so as to optimize communication (bandwidth, latency, . . . ).

In a particular embodiment, the detector module is suitable for detecting communication devices using a plurality of distinct connection interfaces.

No limitation is associated with the way in which connectivity is provided between the devices of the network of the embodiments discussed herein. Various types of interface can be used, such as for example Bluetooth, Wi-Fi, Wi-Fi Direct, LTE, LTE direct, etc. interfaces. Furthermore, each of the devices may have one or more connectivity (or connection) interfaces enabling it to set up peer-to-peer communication with another device of the network of the embodiments discussed herein.

In a particular embodiment, the peer-to-peer communication application is suitable for interrogating at least one routing module to identify at least one communication device with which to set up communication for routing a message.

Correspondingly, the communication network of the embodiments discussed herein comprises at least one routing module suitable for being interrogated by at least one communication device of the network in order to identify another communication device of the communication network with which to set up communication for routing a message.

The interrogated routing module(s) enable each device of the network of the embodiments discussed herein to identify, if necessary, a route within the network for sending a message or a request to a device of the network with which it is not in direct connection, e.g. because it is not within its neighborhood (i.e. within the range of the connectivity interface that is in use). This embodiment makes it possible to connect together remote devices via peer-to-peer communication.

In a particular embodiment, at least one routing module is integrated in at least one communication device of the communication network of the embodiments discussed herein.

It should be observed that all of the devices of the communication network of the embodiments discussed herein may be equipped with a routing module.

The embodiments discussed herein thus also provides a communication device of such embodiments including a said routing module. By way of example, this communication device may be a group owner of a Wi-Fi Direct group, or indeed a particular element (e.g. the router) of a Wi-Fi network (e.g. the HOME Wi-Fi network), depending on the mode of connectivity under consideration.

In this embodiment, each communication device equipped with a routing module is independent (autonomous) for determining the route to be followed in order to reach another device and for setting up communication therewith. This makes it possible to accelerate data exchanges within the network, which can be advantageous for real-time communication.

In another embodiment, the peer-to-peer communication application is suitable for interrogating at least one said routing module located in a network external to the communication network to which the first device belongs.

This embodiment relies on interrogating remote equipment (e.g. a server) hosting a routing module that is external to the communication network of the embodiments discussed herein. The external network in which the remote equipment hosting the routing module is to be found may be a network through which the peer-to-peer communication passes or a network through which the peer-to-peer communication does not pass.

In this more centralized embodiment, it is easier to take account dynamically of route changes that may occur, typically as a result of the appearance or the disappearance of communication devices that could act as relays for the communication within the network of the embodiments discussed herein.

In other embodiments, it is also possible to envisage that the communication device and the communication network of the embodiments discussed herein present in combination some or all of the above-mentioned characteristics.

BRIEF DESCRIPTION OF THE DRAWINGS

Other characteristics and advantages of the embodiments discussed herein appear from the following description made with reference to the accompanying drawings, which show an embodiment having no limiting character. In the figures.

DETAILED DESCRIPTION OF THE PREFERRED EMBODIMENT

Figure 1:
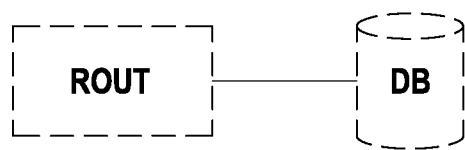
FIG. 1 is a diagram showing a communication network in accordance with a particular embodiment.

FIG. 1 shows a particular embodiment of a communication network 1 in accordance with one embodiment, in its environment.

The communication network 1 comprises a plurality of communication devices D1, D2, . . . , DN performing peer-to-peer communication between one another, where N is an integer greater than 1. To this end, in the embodiment presently described, each communication device of the network 1 is in accordance with the embodiments discussed herein.

In the example shown in FIG. 1, the communication devices forming the network 1 are all terminals (there being five of them in the figure), such as for example mobile telephones, digital tablets, computers, etc., each terminal being equipped with at least one connectivity interface. No limitation is associated with the nature of that interface. By way of example, it may be a Bluetooth, WiFi, WiFi Direct, LTE, LTE Direct, etc. interface. Certain terminals may be equipped with a plurality of connectivity interfaces.

In addition, no limitation is associated with the nature of the devices D1, D2, . . . , DN under consideration in the network 1. These devices may be terminals or servers or any type of equipment in a telecommunications network. It is assumed herein that they have the hardware architecture of a computer, i.e. that they comprise at least one processor, random access memory (RAM), read only memory (ROM), non-volatile memory, input/output peripherals (such as a keyboard, a microphone, a loudspeaker, or indeed a screen), together with communication means comprising the above-mentioned connectivity interface(s).

Furthermore, in the example shown in FIG. 1:
the terminals D1, D2, and D3 form a first mesh (sub) network MN1 within which the device D1 is in direct peer-to-peer communication with the device D2, and the device D2 is in direct peer-to-peer communication with the device D3. Within this first mesh (sub)network MN1, the device D1 can communicate with the device D3 via the device D2; and the terminals D4 and D5 form a second mesh (sub) network MN2 that is distinct from the first mesh (sub)network, and they are in direct peer-to-peer communication.

Naturally, this configuration is given purely by way of illustration and other configurations can be envisaged. For example, the devices of the network 1 may belong to distinct sub-networks, which may be mesh networks or other networks. Some of the devices may in particular belong to operator networks, or to private or business networks, or indeed to the public Internet, etc.

Figure 2:
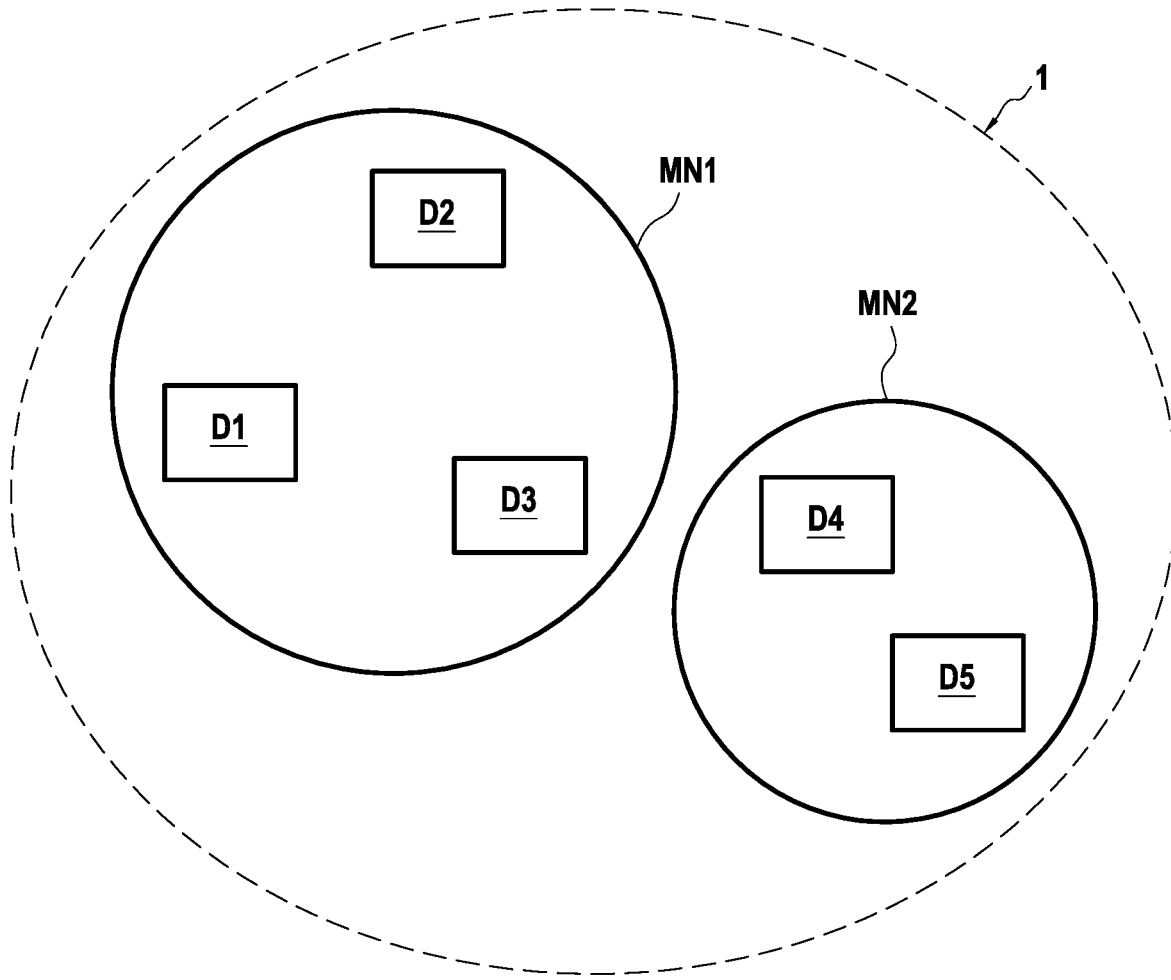
FIG. 2 shows a communication device belonging to the FIG. 1 network.
Figure 2:
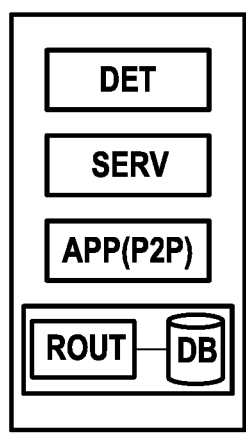

In accordance with the embodiments discussed herein, and as shown in FIG. 2, in order to perform peer-to-peer communication between each of the terminals D1, D2, D3, D4, and D5 of the network 1, all of them are equipped with the following three components:

a peer-to-peer communication application APP(P2P);
a detector module DET; and
a linking module SERV.

In this example, these three components are software components in the form of computer program instructions stored in the ROM of each of the devices and readable by their processors. They rely on or control hardware elements in each of the devices, such as their communication means, their memories, etc. The configuration of such a module so that it performs a given functionality should thus be understood herein as providing computer instructions for the module enabling it to execute the specific functionality.

The detector module DET in each device Dn under consideration, n=1, . . . , N, is configured to detect the presence of one or more communication devices having a connectivity interface that is on or active (in other words accessible by the communication device Dn, i.e. with which the communication device Dn can set up a connectivity link via this interface), and equipped with the peer-to-peer communication application APP(2P2). The detector module DET may for example be configured to detect communication devices located in the vicinity of the device Dn, i.e. within the range of the connectivity interface under consideration.

The detector module DET is also suitable for setting up one or more connections with the detected communication devices. It should be observed that when a connection is set up by the detector module DET of a communication device Dn with a communication Dk that is in a network other than the network in which the communication device Dn is located, the detector module DET of the device Dn may need to pass via equipment external to the communication network of the device Dn, such as for example, and depending on context, a WiFi router accessible to both communication devices Dn and Dk, or a mobile network to which the communication devices Dn and Dk can connect, etc.

The detector device DET may be configured to detect and set up a connection using a single determined connectivity interface. In a variant, it may be capable of detecting and setting up connections over a plurality of distinct connectivity interfaces. Thus, by way of example, it may be configured to detect equally well communication devices provided with a Bluetooth interface and communication devices provided with a WiFi interface. No limitation is associated with the number of interfaces that the detector module DET can detect and with which it can set up connections, nor with the number of those interfaces.

As mentioned above, the detector module DET is configured to determine whether the devices it has detected and that are accessible by the communication device Dn (because they have a connectivity interface that is on or active and with which the device Dn can connect) are equipped with the peer-to-peer communication application APP(P2P) in order to be able to communicate in ad hoc manner with the device Dn.

It should be observed that such a detector module is itself known, and by way of example is already present in prior art APIs performing the WiFi Direct function. When negotiating between neighboring terminals in order to use the WiFi Direct function (that enables peer-to-peer communication to be performed between two neighboring terminals via a WiFi interface), such APIs make provision for discovering terminals that are present in the neighborhood and that are equipped with a WiFi interface itself equipped with a dedicated communication application performing this function. Implementing detector module functions for an interface other than a WiFi interface does not pose any problem for the person skilled in the art and is not described in detail herein.

In accordance with the embodiments discussed herein, the linking module SERV is a component of the communication device Dn that is accessible in server mode. The term "accessible in server mode" is used herein to mean that the linking module SERV is configured to listen (at least) to a predetermined port (written P) using (at least) one particular protocol (e.g. the hypertext transfer protocol (HTTP), this particular protocol being written PROT, and to do so for the purpose of detecting whether a particular predefined request has been specifically addressed thereto by a communication device equipped with the application APP(P2P) and detected by the detector module DET (where the particular request in this example is a request to set up peer-to-peer communication, and is written REQ). It is also configured in this server type mode of operation to respond to the request by triggering and organizing an exchange of information with the device that sent it the request and by setting up a peer-to-peer communication link with the device at the end of this exchange on the basis of the information that has been exchanged.

For this purpose, in the presently-described embodiment, the linking module SERV is particularly suitable for exchanging various types of information with the device(s) Dk, k☐n, detected by its detector module DET and that have sent it a request to set up peer-to-peer communication, which information is required for setting up peer-to-peer communication with said device(s), such as in particular:

information about the capabilities of the device Dn and of the devices Dk, such as for example storage capacities, memory capacities, available CPU capacities, or indeed concerning screen resolution, if there is a screen, concerning the codec(s) used, etc. Naturally, the nature of this information depends on the context in which the embodiments discussed herein are applied and on the type of communication that is to be performed between the devices (communication in real time or not in real time, relying on exchanging data of text or voice or video, etc. type); and/or connectivity information enabling the device Dn to connect with the devices Dk, such as for example SDP session parameters, an ICE candidate, available bandwidth, etc.

Such information about the capabilities of the devices and/or about connectivity is necessary to enable a peer-to-peer communication link to be set up between the devices (prior to performing peer-to-peer communication properly speaking between the devices). In accordance with the embodiments discussed herein, it is the linking module SERV of the device Dn that is advantageously configured to trigger and organize this exchange of information with the devices Dk so as to enable a peer-to-peer communication link to be set up with the devices Dk. No server external to the devices is needed for obtaining this information and enabling the devices Dn and Dk to be linked prior to peer-to-peer communication.

In the presently-described embodiment, the linking module SERV is also configured to enable information to be exchanged between the detector module DET and the communication application APP(2P2) within the device Dn. By way of example, this information may comprise an identifier of the device Dn, or its IP address, which may be used by both modules.

In a variant, the detector module DET and the communication application APP(P2P) may be configured to exchange this information directly.

In a particular embodiment, the linking module SERV and the application APP(P2P) may rely on WebRTC technology, and in particular on the functions performed by WebRTC servers. Nevertheless, the embodiments discussed herein are not limited to this particular embodiment nor to this technology.

The peer-to-peer communication application APP(P2P) present on each device Dn of the network 1 is a software application suitable for managing the communication proper as set up. No limitation is associated with the nature of this communication. It may be communication comprising the exchange of text data, voice communication, video communication, real-time communication, or communication relying on an asynchronous exchange of messages, etc.

In this example, it includes a conventional man-machine interface (MMI), which interfaces with the input/output peripherals of the device Dn and allows a user of the device Dn to communicate with other users via their respective terminals Dk, using one or more modes of communication (text, voice, video, etc.).

In accordance with the embodiments discussed herein, in order to set up peer-to-peer communication between the device Dn and another device Dk as detected by the detector module DET, the peer-to-peer communication application APP(P2P) is configured to send a peer-to-peer communication setup request REQ to the device Dk, and more particularly to the linking module SERV of the device Dk. This request REQ is addressed specifically by the application APP(P2P) of the device Dn to the linking module SERV of the device Dk by using the protocol PROT to send it over the port P to which the linking module SERV of the device Dk is listening. The linking module SERV of the device Dk responds to this setup request by setting up a peer-to-peer link with the device Dn. Once this link has been set up, the devices Dn and Dk can perform peer-to-peer communication (in this example over a direct link) by exchanging messages or requests, depending on the application APP(P2P) under consideration.

In order to set up peer-to-peer communication between two remote communication devices Dn and Dk, e.g. belonging to two distinct mesh networks or to the same mesh network, the application APP(P2P) is configured to interrogate one or more routing modules ROUT in order to identify a route in the communication network 1 that enables these two communication devices to be linked (connected) together. The term "route" is used to mean a succession of peer-to-peer communicating devices (and more precisely device-to-device (D2D) devices, i.e. that are directly in communication in pairs), acting as intermediaries between the devices Dk and Dn in order to allow those two devices to communicate, in other words in order to relay the messages and/or requests exchanged between the devices in the context of the communication.

In the embodiment shown in FIGS. 1 and 2, each communication device D1 to D5 has a routing module ROUT capable of being interrogated independently (autonomously) by the peer-to-peer communication application APP(P2P) of the communication device.

In another embodiment, consideration may be given to one or more routing modules ROUT located outside the network 1 and the mesh networks MN1 and MN2 (routing module shown in dashed lines in FIG. 1), e.g. on a central server that is accessible to all of the communication devices D1 to D5, and that is situated in a network that is external to the network 1, such as for example in an operator network. This can be referred to as a centralized routing mode.

It should be observed that the network 1 has a plurality of routing modules (which are hosted by the communication devices or which are located at other pieces of equipment in the network 1), with it not being essential for the data in these routing modules to be synchronized. Under such circumstances, each communication device can interrogate a pool of routing modules in order to identify a route for setting up communication to some other communication device of the network 1.

In another variant, only some of the communication devices of the network 1 host such a routing module, and these communication devices can be interrogated by those devices of the network 1 that do not include such routing modules.

In this example, each routing module ROUT hosts and makes use of a database DB listing at least a subset of the communication devices of the network 1 (e.g. by means of an identifier), together with their geographical locations, and optionally together with other characteristics such as information about available bandwidth, memory, etc., so as to enable the routing module to identify a route in the network 1 for peer-to-peer communication when it is interrogated by the communication device that hosts it. The database DB in this example is preferably updated in real time, i.e. each time a communication device appears and disappears in the network 1, e.g. as a result of a device being switched on or of the application APP(P2P) of the device being launched, or as a result of a device being switched off or of the application APP(P2P) of the device being disconnected.

In a variant, it is possible to envisage updating the database DB less frequently (e.g. periodically), in particular when the number of communication devices in the network 1 is large (e.g. greater than several hundreds of devices).

It should be observed that the database DB is not necessarily hosted by the routing module ROUT and that it may be located in a remote storage space. For simplification purposes, in this example it is assumed that the databases DB hosted by the various communication devices D1 to D5 of the network 1 are mutually synchronized.

It is possible to envisage various different modes of interrogating the routing module ROUT hosted by each communication device D1 to D5. Thus, the application APP(P2P) of a communication device may interrogate its routing module either to identify a route to be followed through the network 1 (i.e. a succession of communication devices), or to identify a relay communication device, e.g. located in the vicinity of the communication device on which it is installed in order to send it a message or a request for the purpose of conveying the message or the request to its destination. During such interrogation, the application APP(P2P) may specify, in addition to the final communication device with which it seeks to exchange data, various other characteristics, such as for example a criterion for selecting the relay communication device or the route to be followed such as "fastest route" (in terms of devices passed through), "route with greatest bandwidth/rate", "route with shortest latency", etc. Many other criteria may be envisaged as variants. This can enable communication to take place within the network 1 by using a path that satisfies certain particular criteria (passing via relay devices having certain characteristics in terms of CPU capacity, memory, storage, load, latency, or indeed bandwidth/rate).

In order to determine the route to be followed or the relay communication device for reaching the final communication device, the routing module ROUT may apply routing protocols that are known to the person skilled in the art. Thus, in the example shown in FIG. 1 where each communication device hosts its own routing module, the module may make use by way of example of routing protocols defined by the mobile ad hoc networks (MANET) working group of the Internet engineering task force (IETF) for ad hoc networks, such as the reactive dynamic source routing (DSR) protocol, or indeed the proactive optimized link state routing (OLSR) protocol. These algorithms are preferably applied for networks having a few tens or a few hundreds of communication devices, in order to avoid overloading the network as a result of the number of messages exchanged between the communication devices each time a communication is routed.

Thus, the embodiments discussed herein make it possible to set up communication in peer-to-peer mode between two communication devices that do not necessarily belong to the same mesh network, and can do so in various different modes (text, voice, video, data, etc.).

Figure 3:
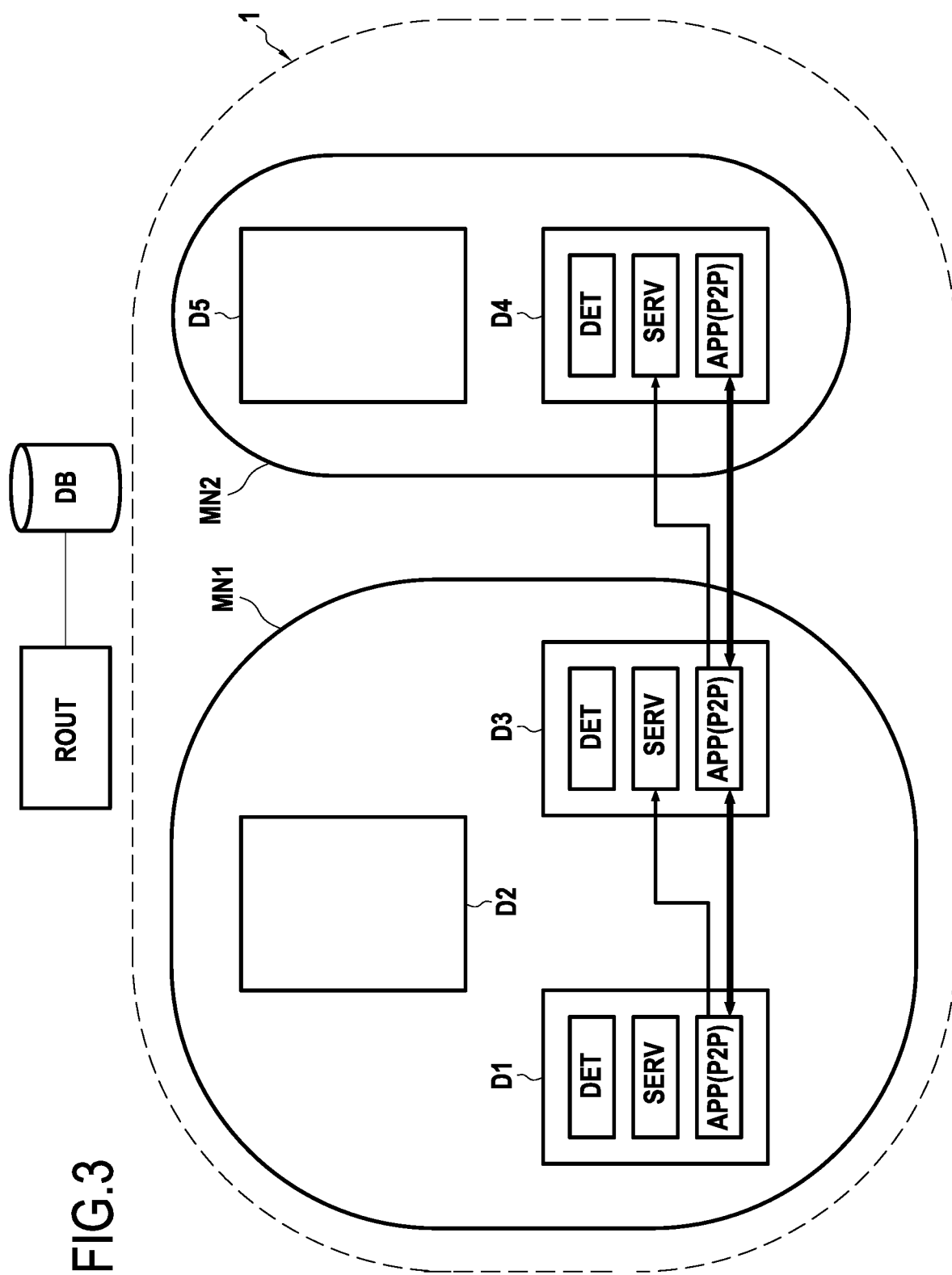
FIG. 3 shows a mode of operation of the communication network.

FIG. 3 is a diagram showing communication between the communication device D1 and the communication device D4 via the communication device D3, where D1 and D3 belong to the same mesh network MN1, and D4 belongs to the mesh network MN2.

In this configuration, when the device D1 seeks to set up communication with the communication device D4, the detector module DET of the device D1 detects the communication device(s) situated in its neighborhood that possess a determined connectivity interface (e.g. of Bluetooth type) and on which the peer-to-peer communication application APP(P2P) is installed. In the example shown in FIG. 3, it is assumed that the detector module DET of the device D1 detects the communication devices D2 and D3 that belong to the same mesh network MN1 as the device D1. It should be observed that this prior detection step enables the respective detector module DET of the various devices of the network 1 to detect not only the presence of devices located in their own neighborhoods, but also to exchange with those devices their capabilities in order to identify which ones of them are equipped with the application APP(P2P). Thus, not only does D1 detect that the device D3 is in its neighborhood and that it is equipped with the application APP(P2P), but D3 also detects that D1 is to be found in its neighborhood and is equipped with the same application.

Since the communication device D4 does not form part of the devices detected by the detector module DET (e.g. because it is not reachable via the Bluetooth interface of the device D1), the peer-to-peer application APP(P2P) of the device D1 interrogates its routing module ROUT to determine a route or at least an intermediate communication device for reaching the communication device D4.

The routing module ROUT of the device D1 in turn interrogates its database DB and identifies the route constituted by the communication devices D3 and D4. It transmits the route that it has identified in this way to the communication application APP(P2P) of the communication device D1.

Since the communication device D3 is in the vicinity of the communication device D1 (in the presently-considered Bluetooth interface sense), the device D1 uses its detector module DET and its connectivity interface to set up a connection with the device D3 (if one does not already exist).

Thereafter, the application APP(P2P) of the device D1 sends a request to the linking module SERV of the device D3 to set up peer-to-peer communication over the port P using the protocol PROT.

On receiving this request, the linking module SERV of the device D3 organizes an exchange of information between the devices D1 and D3 to enable direct peer-to-peer communication to be set up between these two devices (e.g. ICE candidates, SDP session information, etc.). The kind of information exchanged between the devices is described above and not repeated in detail here.

After this exchange of information, peer-to-peer communication is set up between the devices D1 and D3, and it is possible for both-way data exchanges to take place between the application APP(P2P) of the devices D1 and D3 via messages or requests, as represented by a double-headed arrow in FIG. 3.

Furthermore, and in a manner similar to that described above, the detector module DET of the device D3 detects that the device D4 is in its neighborhood (e.g. on the basis of information available about the device D4 in the database DB of the routing module ROUT of the device D3, or via its connectivity interface, e.g. if it is of Bluetooth or WiFi type) and that it is provided with the application APP(P2P). The detector module DET of the device D3 then sets up a connection with the device D4 which has itself, via its detector module DET, detected the presence of the device D3 and the installation of the application APP(P2P) thereon. It should be observed that the devices D3 and D4 do not belong to the same mesh network (D3 belonging to the mesh network MN1, while D4 belongs to the mesh network MN2), and the detector module DET of the device D3 may, where appropriate, detect the presence of the communication device D4 in its vicinity by using a connectivity interface that is different from that which it uses with the communication device D1 (e.g. a WiFi interface instead of Bluetooth, or a wired interface), or it may consult geographical location information contained in the database DB of its own routing module ROUT. In addition, it may need to set up a connection link with the communication device D4 by passing via equipment that is external to the network MN1, such as for example, and depending on context: a WiFi router accessible by the communication devices D3 and D4, a mobile network to which the communication devices D3 and D4 can connect, etc.

Thereafter, the application APP(P2P) of the device D3 sends a request to the linking module SERV of the device D4 to set up peer-to-peer communication over the port P and using the protocol PROT. On receiving this request, the linking module SERV of the device D4 organizes an exchange of information between the devices D3 and D4 in order to enable direct peer-to-peer communication to be set up between these two devices (e.g. ICE candidates, SDP session information, etc.). After this exchange of information, peer-to-peer communication is set up between the devices D3 and D4, and both-way data exchanges can take place between the application APP(P2P) of the two devices D3 and D4, via messages or requests, and as represented by a double-headed arrow in FIG. 3.

Once this communication is set up, the device D3 can relay to the device D4 messages that are transmitted thereto by the device D1 for the device D4, and it can relay to the device D1 messages that are transmitted thereto by the device D4 for the device D1. Peer-to-peer communication is thus made possible between the devices D1 and D4 via the device D3.

This example is given purely by way of illustration and it can naturally be generalized to a plurality of intermediate communication devices. The network 1 formed by the devices D1 to D5 thus serves so to speak to aggregate the mesh networks MN1 and MN2 so as to enable peer-to-peer communication to take place between the communication devices of those networks.

What is claimed is:

1. A first communication device, the first communication device having a peer-to-peer communication application installed thereon, the first communication device comprising: a processor configured to execute instructions stored on a computer-readable medium to:
   act in server mode to:
      monitor at least one port listened to via at least one protocol, to detect a request to set up a peer-to-peer communication link;
   in response to receiving, on a first of said at least one monitored port and via a first of said at least one protocol, a first request to set up a peer-to-peer communication link with a second communication device running the peer-to-peer communication application:
      trigger an exchange with the second communication device to exchange information required for setting up a peer-to-peer communication link with the second communication device, wherein the exchanged information includes connectivity information for connecting the first and the second communication device and information relating to capabilities of the first or the second communication device, and wherein the connectivity information comprises an Interactive Connectivity Establishment (ICE) candidate for connecting the first communication device and the second communication device and information about external connections of the first and the second communication devices towards connectivity interfaces, and
      set up the peer-to-peer communication link with the second communication device using the information exchanged with the second communication device; and
   send on one of said at least one monitored port and via one of said at least one protocol a second request to set up a peer-to-peer communication link to a detected third communication device.

2. The first communication device of claim 1, wherein the peer-to-peer communication application is a real-time communication application.

3. The first communication device of claim 1, wherein the processor is configured to detect communication devices using a plurality of distinct connection interfaces.

4. The first communication device of claim 1, wherein the peer-to-peer communication application is configured to interrogate at least one routing module to identify at least one first communication device with which to set up communication for routing a message.

5. The first communication device of claim 4, wherein the first communication device includes the routing module.

6. The first communication device of claim 4, wherein the at least one routing module is located in a network external to a communication network to which the first communication device belongs.

7. The first communication device of claim 1, wherein the information exchanged with the second communication device comprises connectivity information, the connectivity information including:
   parameters to initiate a Session Data Protocol (SDP) session; and
   at least one of:
      an Interactive Connectivity Establishment (ICE) candidate for connecting the first communication device and the second communication device;
      an available bandwidth, and
      information about external connections of the first and the second communication devices towards connectivity interfaces.

8. A communication network comprising a plurality of communication devices, said plurality of communication devices comprising the first communication device of claim 1.

9. The communication network of claim 8, wherein a first and a second communication device of the plurality of communication devices belong to distinct peer-to-peer mesh sub-networks.

10. The communication network of claim 8, further comprising at least one routing module configured to be interrogated by at least one first communication device of the network in order to identify another first communication device of the communication network with which to set up communication for routing a message.

11. The first communication device of claim 1, wherein the information exchanged with the second communication device comprises connectivity information, the connectivity information including:
   an Interactive Connectivity Establishment (ICE) candidate for connecting the first communication device and the second communication device; and
   at least one of:
      parameters to initiate a Session Data Protocol (SDP) session;
      an available bandwidth, and
      information about external connections of the first and the second communication devices towards connectivity interfaces.

12. The first communication device of claim 1, wherein the information exchanged with the second communication device comprises connectivity information, the connectivity information including an Interactive Connectivity Establishment (ICE) candidate for connecting the first communication device and the second communication device.

13. The first communication device of claim 1, wherein the information exchanged with the second communication device comprises connectivity information, the connectivity information including an available bandwidth.

14. The first communication device of claim 1, wherein the information exchanged with the second communication device comprises connectivity information, the connectivity information including an available bandwidth parameters to initiate a Session Data Protocol (SDP) session.

15. The first communication device of claim 1, wherein the information exchanged with the second communication device is exchanged directly between the first communication device and the second communication device.

16. A communication method performed by a first communication device having a peer-to-peer communication application installed thereon, the method comprising:
    acting in server mode to:
        monitor at least one port listened to via at least one protocol to detect a request to set up a peer-to-peer communication link;
        in response to receiving, on a first of said at least one monitored port and via a first of said at least one protocol, a first request to set up a peer-to-peer communication link with the second communication device running the peer-to-peer communication application:
            trigger an exchange with the second communication device to exchange information required for setting up a peer-to-peer communication link with the second communication device, wherein the exchanged information includes connectivity information for connecting the first and the second communication device and information relating to capabilities of the first or the second communication device, and wherein the connectivity information comprises an Interactive Connectivity Establishment (ICE) candidate for connecting the first communication device and the second communication device and information about external connections of the first and the second communication devices towards connectivity interfaces, and
            set up the peer-to-peer communication link with the second communication device using the information exchanged with the second device; and
    send on one of said at least one monitored port and via one of said at least one protocol a second request to set up a peer-to-peer communication link to a detected third communication device.

17. The communication method of claim 16, wherein the first communication device detects communication devices using a plurality of distinct connection interfaces.

18. The communication method of claim 16, wherein the peer-to-peer communication application interrogates at least one routing module to identify at least one first communication device with which to set up communication for routing a message.

19. A first communication device, the first communication device having a peer-to-peer communication application installed thereon, the first communication device comprising:
    a processor configured to execute instructions stored on a computer-readable medium to:
        act in server mode to:
            monitor at least one port listened to via at least one protocol, to detect a request to set up a peer-to-peer communication link;
            in response to receiving, on a first of said at least one monitored port and via a first of said at least one protocol, a first request to set up a peer-to-peer communication link with a second communication device running the peer-to-peer communication application:
                trigger an exchange with the second communication device to exchange information required for setting up a peer-to-peer communication link with the second communication device, wherein the exchanged information includes connectivity information for connecting the first and the second communication device and information relating to capabilities of the first or the second communication device, and
                set up the peer-to-peer communication link with the second communication device using the information exchanged with the second communication device; and
        send on one of said at least one monitored port and via one of said at least one protocol a second request to set up a peer-to-peer communication link to a detected third communication device,
        wherein the connectivity information comprises at least one of: an Interactive Connectivity Establishment (ICE) candidate for connecting the first communication device and the second communication device and information about external connections of the first and the second communication devices.

20. The first communication device of claim 19, wherein the peer-to-peer communication application is a real-time communication application.

* * * * *